(12) United States Patent
Ronald et al.

(10) Patent No.: US 9,895,781 B2
(45) Date of Patent: Feb. 20, 2018

(54) APPARATUS FOR MOUNTING AN ACCESSORY TO A COORDINATE POSITIONING APPARATUS

(75) Inventors: Keith Ronald, Gloucester (GB); John Philip Laurence Taylor, Gloucester (GB)

(73) Assignee: RENISHAW PLC, Wotton-Under-Edge (GB)

( * ) Notice: Subject to any disclaimer, the term of this patent is extended or adjusted under 35 U.S.C. 154(b) by 2045 days.

(21) Appl. No.: 13/120,268

(22) PCT Filed: Sep. 28, 2009

(86) PCT No.: PCT/GB2009/002302
§ 371 (c)(1),
(2), (4) Date: Mar. 22, 2011

(87) PCT Pub. No.: WO2010/038009
PCT Pub. Date: Apr. 8, 2010

(65) Prior Publication Data
US 2011/0198790 A1    Aug. 18, 2011

(30) Foreign Application Priority Data

Oct. 3, 2008 (GB) .................................. 0818086.1
Oct. 3, 2008 (GB) .................................. 0818143.0
Dec. 19, 2008 (GB) .................................. 0823206.8

(51) Int. Cl.
*B23Q 1/00* (2006.01)
*B23Q 3/10* (2006.01)

(52) U.S. Cl.
CPC ............. *B23Q 3/102* (2013.01); *B23Q 3/103* (2013.01)

(58) Field of Classification Search
USPC ....... 29/281.1; 269/37, 54.4, 74, 291, 289 R, 269/290, 900
See application file for complete search history.

(56) References Cited

U.S. PATENT DOCUMENTS 2,807,883 A    10/1957    Mayne
4,077,290 A *   3/1978    Hreha .......................... 83/471.2
(Continued)

FOREIGN PATENT DOCUMENTS

DE    35 13 806 A1    10/1986
DE    38 21 632 A1     2/1989
(Continued)

OTHER PUBLICATIONS

Japanese Office Action issued in Application No. 2011-529613; dated Apr. 30, 2013 (With Translation).
(Continued)

*Primary Examiner* — David Bryant
*Assistant Examiner* — Nirvana Deonauth
(74) *Attorney, Agent, or Firm* — Oliff PLC (57) ABSTRACT

An apparatus for mounting a coordinate positioning apparatus accessory, such as a tool setter, to the workpiece mounting surface of a coordinate positioning apparatus, the workpiece mounting surface having a slot formed in it. The apparatus includes an insert for inserting into the slot of the workpiece mounting surface, and a mount attachable to a coordinate positioning apparatus accessory. The insert includes structure to fix the insert within the slot; the insert is substantially contained within the slot when inserted therein. The mount includes at least one protruding member for engaging the insert when contained within the slot, thereby fixing the mount, and therefore any coordinate positioning apparatus accessory attached to the mount, to the workpiece mounting surface of the coordinate positioning apparatus.

29 Claims, 9 Drawing Sheets

(56) References Cited

U.S. PATENT DOCUMENTS

| | | | |
|---|---|---|---|
| 4,476,757 A | 10/1984 | Morris | |
| 4,805,888 A * | 2/1989 | Bishop | 269/99 |
| 5,026,033 A * | 6/1991 | Roxy | 269/45 |
| 5,056,766 A * | 10/1991 | Engibarov | 269/136 |
| 5,275,074 A | 1/1994 | Taylor et al. | |
| 5,509,644 A * | 4/1996 | Engibarov | 269/99 |
| 5,735,054 A | 4/1998 | Cole | |
| 5,979,283 A | 11/1999 | Osborne | |
| 5,984,291 A * | 11/1999 | Iwata et al. | 269/73 |
| 6,105,951 A | 8/2000 | Shibata | |
| 2002/0162439 A1 | 11/2002 | Fontaine | |
| 2004/0051225 A1 | 3/2004 | Etter | |
| 2005/0241450 A1 | 11/2005 | Schwartz | |
| 2008/0047155 A1* | 2/2008 | Madlener et al. | 33/503 |
| 2009/0214303 A1 | 8/2009 | Haimer | |

FOREIGN PATENT DOCUMENTS

| | | |
|---|---|---|
| DE | 40 13 792 A1 | 10/1991 |
| DE | 41 14 295 A1 | 11/1992 |
| DE | 42 18 121 C1 | 9/1993 |
| DE | 10 2005 043 751 A1 | 3/2007 |
| EP | 0 126 794 A1 | 12/1984 |
| EP | 0 642 350 A1 | 1/1996 |
| GB | 2 098 106 A | 11/1982 |
| GB | 2 185 199 A | 7/1987 |
| JP | A-05-177477 | 7/1993 |
| JP | A-06-341804 | 12/1994 |
| JP | A-2002-195235 | 7/2002 |
| JP | A-2009-208203 | 9/2009 |
| WO | WO 97/018436 | 5/1997 |

OTHER PUBLICATIONS

British Search Report issued in British Patent Application No. 0818086.1, dated Jun. 5, 2009.

International Search Report issued in International Patent Application No. PCT/GB2009/002302, dated Jan. 22, 2010.

Written Opinion of the International Searching Authority issued in International Patent Application No. PCT/GB2009/002302, dated Jan. 22, 2010.

Dec. 5, 2012 Office Action issued in Japanese Application No. 200980139635.7 (with translation).

Apr. 22, 2014 Official Notice of Final Decision of Rejection issued in Japanese Patent Application No. 2011-529613 (with English Translation).

* cited by examiner

APPARATUS FOR MOUNTING AN ACCESSORY TO A COORDINATE POSITIONING APPARATUS

The present invention relates to an apparatus for mounting an accessory to a workpiece mounting surface of a coordinate positioning apparatus. In particular the invention relates to an apparatus for mounting a machine tool accessory to a workpiece mounting surface of a machine tool.

Coordinate positioning apparatus includes, for example, machine tools and coordinate measuring machines. A typical machine tool comprises a spindle into which a tool for machining workpieces, or a probe for measuring workpieces, can be mounted and a machine tool table or bed on which a workpiece can be supported for machining or measuring. The machine tool bed may also support machine tool accessories, such as tool-setters for detecting the presence and position of a tool held in the machine tool spindle. In a conventional 'vertical machine tool' the machine tool bed can be driven in two orthogonal directions X and Y, and the spindle driven in a third orthogonal direction Z, such that the spindle and bed are moveable within a working volume of the machine.

Machine tool beds are often provided with a number of tee slots running along the length of the bed, each tee slot having open ends at either side of the bed; such tee-slots typically run parallel to one another, spaced apart across the width of the bed. Further tee slots may run perpendicular to said tee slots, thereby forming a crossed pattern of tee slots in the machine tool bed. The size and shape of the tee slots in machine tool beds, and tee bolts and nuts for use with tee slots, are defined by standards such as BS 2485; 1987. As described in GB 2098106 it is known to secure machine tool accessories to the machine tool bed via a tee groove using a conventional tee bolt and a nut.

According to a first aspect the present invention provides an apparatus for mounting a coordinate positioning apparatus accessory to the workpiece mounting surface of a coordinate positioning apparatus, the workpiece mounting surface having a slot formed therein, the apparatus comprising: an insert comprising means for fixing the insert within a slot, wherein the insert is substantially contained within the slot when inserted therein; and a mount attachable to a coordinate positioning apparatus accessory, the mount comprising at least one protruding member for engaging the insert when the insert is contained within a slot, thereby fixing the mount to the workpiece mounting surface of a coordinate positioning apparatus.

As will be understood the insert, when substantially contained within a slot, does not substantially protrude from the workpiece mounting surface of a coordinate positioning apparatus. The insert can be flush with the workpiece mounting surface when substantially contained within the slot. Advantageously, the insert is sub-flush with the workpiece mounting surface when substantially contained within the slot. When the insert is contained within the slot a part of the insert may be exposed to the working volume of the coordinate positioning apparatus by the opening of the slot; said part may be an exposed face of the insert.

The insert can be a longitudinal insert having a first and second end. The insert can be substantially cuboid shaped; the insert can have four longitudinal faces. Alternatively, the insert can have three longitudinal faces and one open face. The first and second ends of the insert can have first and second end faces. At least one of said end faces can be provided with receiving means for receiving engaging means provided on the at least one protruding member of the mount. Preferably both the first and second end faces are provided with such receiving means. The insert can alternatively have an equal width and length.

The apparatus can be, for example, for mounting a machine tool accessory to the workpiece mounting surface of a machine tool. Alternatively the apparatus can be for mounting a coordinate measuring machine accessory to a coordinate measuring machine.

The means for fixing the insert within a slot may comprise an expandable member, such that the insert is held within the slot by friction. Advantageously the means for fixing the insert within a slot comprises one or more screws. Conveniently, the one or more screws are adjustable by means accessible from the exposed part of the insert when the insert is contained within a slot. The one or more screws can be one or more tapered screws. Conveniently, where the insert is a longitudinal insert, a first tapered screw can be positioned towards the first end of the insert and a second tapered screw can be positioned toward the second end of the insert. The position of the one or more screws within the insert can be adjusted such that they cause the width of the insert to expand and enable the insert to be held in the slot by friction.

Alternatively the one or more screws may be standard screws, said screws passing into a tapered wedge within the insert, for example. In this case adjusting the position of the one or more screws can adjust the position of the wedge such that the width of the insert expands, thus holding the insert within the slot by friction. As an alternative to a tapered wedge a cylindrical rod or dog bone cylindrical rod for example, could be used.

The one or more screws may each comprise a screw head and a screw shaft extending from the screw head; the screw may have a longitudinal axis. The insert may be formed such that tightening of the one or more screws causes the insert to expand in at least one direction. The insert and screw may be arranged such that the screw shaft enters the insert at a first side of the insert. A clearance gap may be provided between the screw thread and the insert at the first side of the insert. The end of the screw shaft distal from the screw head may engage the insert at a second side of the insert. Tightening of the screw may draw the second side of the insert towards the first side of the insert and thus expand the insert. Expansion of the insert may occur in a direction substantially orthogonal to the longitudinal axis of the screw.

The means for fixing the insert within a slot can comprise at least one screw or plate which extends from at least one side of the insert towards at least one wall of the slot within which the insert is contained. This expands the width of the insert to hold the insert within the slot by friction. Advantageously, the at least one screw or plate is adjustable by means accessible from the exposed face of the insert.

The means for fixing the insert within a slot can comprise other suitable fixing means such as, for example, adhesive.

The means for fixing the insert within a slot can comprise means for fixing the insert within a tee slot formed in the workpiece mounting surface of a coordinate positioning machine. Alternatively the means for fixing the insert within a slot can comprise means for fixing the insert within a U-shaped slot formed in the workpiece mounting surface of a coordinate positioning machine. Conveniently the means for fixing the insert within a slot can comprise means for fixing the insert within a variety of different slot configurations such as a tee slot, or a U-shaped slot formed in the workpiece mounting surface of a coordinate positioning machine. A U-shaped slot can have, for example, parallel side walls and a perpendicular base, or a curved base and side walls.

Advantageously, the mount and insert are arranged such that the position of the mount with respect to the insert is substantially repeatable. The mount can comprise a plurality of protruding members. Conveniently, the mount comprises two protruding members. Alternatively the mount may comprise, for example, three or four protruding members. Where the insert is a longitudinal insert, two protruding members, for example, can be arranged such that one protruding member engages a first end of the longitudinal insert and the other protruding member engages a second end of the longitudinal insert. In particular, the protruding members can each have two faces, an inner face which faces towards another protruding member and an outer face which faces away from another protruding member. Advantageously, the distance between the inner faces of the protruding members is substantially equal to the longitudinal length of the insert.

The protruding members can be provided with engaging means for engaging with the insert. Such engaging means can comprise a protrusion, such as a ball or a rod. The protrusion can be positioned so as to protrude from the inner face of the protruding members, toward another protruding member.

At least one of the plurality of protruding members can be moveable relative to the mount. Additionally, at least one of the plurality of protruding members can be fixed relative to the mount. Where there are two protruding members, advantageously one protruding member is moveable relative to the mount and the other protruding member is fixed relative to the mount. The moveable protruding member can be biased into a first position by a bias member, such as a spring, and can be moveable against said bias into a second position. Alternatively, the moveable protruding member may be moveable between a first and second position by, for example, adjusting a screw attaching the moveable protruding member to the base.

When the moveable protruding member is in the first position the distance between the protruding members can be substantially equal to the longitudinal length of the insert. When the moveable protruding member is in the second position the distance between the protruding members can be greater than the longitudinal length of the insert. Movement of the moveable protruding member can allow the distance between the protruding members to be increased such that the protruding members are able to pass around each end of the insert in order to engage the insert.

The at least one protruding member moveable relative to the mount can be a hand moveable member. In this case the at least one moveable protruding member can comprise a handle portion, such that the moveable protruding member can be moved against the bias by applying pressure to the handle portion.

The insert can comprise at least one receiving means for receiving the at least one protruding member of the mount. In particular the insert may comprise at least one receiving means for receiving engaging means on the at least one protruding member of the mount. Advantageously, the insert comprises a number of receiving means equal to the number of engaging means provided on the at least one protruding member on the mount. Where there are two protruding members, each having an engaging means, the insert may have two receiving means. Where the insert is a longitudinal insert having first and second ends the first of the two receiving means can be provided at the first end of the insert and the second of the two receiving means can be provided at the second end of the insert.

The at least one receiving means can provide one point of contact for contacting a protruding member. Such a receiving means can be, for example, a protruding ball. The protruding ball may be positioned adjacent a recess to provide clearance for the engagement means on the protruding member to contact the ball without contacting the insert at any other point. Where there are two receiving means, and two protruding members each having an engagement means, each receiving means can provide one point of contact with one engagement means. In this case, engagement of the mount with the insert constrains two degrees of freedom of the mount with respect to the insert.

The action of engaging the at least one protruding member of the mount with the insert can urge the at least one protruding member of the mount against at least one wall of a slot in which the insert is contained. Where there is more than one protruding member the protruding members may be urged against the same wall, or different walls. Where there are two protruding members and each protruding member is urged against a wall of the slot, two further degrees of freedom between the mount and the insert can be constrained.

The at least one receiving means can provide two points of contact for contacting a protruding member. Such a receiving means can be, for example, a V-shaped recess. Where there are two receiving means, and two protruding members each having an engagement means, each receiving means can provide two points of contact with one engagement means. In this case engagement of the mount with the insert constrains four degrees of freedom of the mount with respect to the insert.

When the mount is engaged with the insert one degree of freedom between the mount and the insert can be constrained by the surface of the mount contacting the workpiece mounting surface within which the insert is fixed. Where one protruding member is moveable with respect to the mount another degree of freedom between the mount and the insert can be constrained when the moveable protruding member is urged into contact with the insert.

Where six degrees of freedom are constrained between the mount and the insert, the mount can be kinematically located.

The apparatus may additionally comprise a coordinate positioning apparatus accessory attached to the mount. The coordinate positioning apparatus accessory can comprise a measurement probe. Conveniently, the coordinate positioning apparatus accessory is a machine tool accessory; said machine tool accessory may comprise, for example, a toolsetter.

The apparatus can be an apparatus for mounting a coordinate positioning apparatus accessory to a workpiece mounting surface on the bed of a coordinate positioning apparatus or to a workpiece mounting surface on a pallet. The apparatus described can be, for example, apparatus for mounting a machine tool accessory to machine tool bed, or to a workpiece mounting surface on a pallet.

According to a second aspect the present invention provides an insert with means for fixing the insert within a slot in a workpiece mounting surface of a coordinate positioning apparatus, wherein the insert is substantially contained within the slot when inserted therein. The coordinate positioning apparatus can be a machine tool. Alternatively the coordinate positioning apparatus can be, for example, a coordinate measuring machine.

The means for fixing the insert within a slot in a workpiece mounting surface of a coordinate positioning apparatus can comprise an expandable member, such that the insert is fixed within the slot by friction. The means for fixing the insert within a slot can comprise, for example, screws or adhesive.

According to a third aspect of the present invention a mount, attachable to a coordinate positioning apparatus accessory, comprises at least one protruding member for engaging an insert substantially contained within a slot in the workpiece mounting surface of a coordinate positioning apparatus, the at least one protruding member, when engaged with an insert, holding the mount to the workpiece mounting surface. The coordinate positioning apparatus can be a machine tool. Alternatively the coordinate positioning apparatus can be, for example, a coordinate measuring machine.

The insert may additionally comprise at least one spacer or shim for increasing the width of the insert such that it is able to fit and to be fixed within a variety of different sized slots. The at least one shim may be fixed to the main insert body (otherwise referred to as the insert hereinbefore) by one or more spring pins passing through the at least one shim into a hole in the insert, for example. It will be understood that other means of fixing shims to the main insert body are possible.

Where at least one shim is used, conveniently a shim or spacer is provided on both sides of the width of the main insert body. Preferably the width of said shims or spacers are substantially equal such that the width of the insert is increased substantially equally on both sides. Advantageously the length of the at least one shim is longer than the length of the main insert body such that at least one protruding member of the mount can be brought into contact with the shim when the mount is mounted to the insert.

Preferred embodiments of the invention will now be described, by way of example only, with reference to the accompanying drawings wherein.

Figure 1:
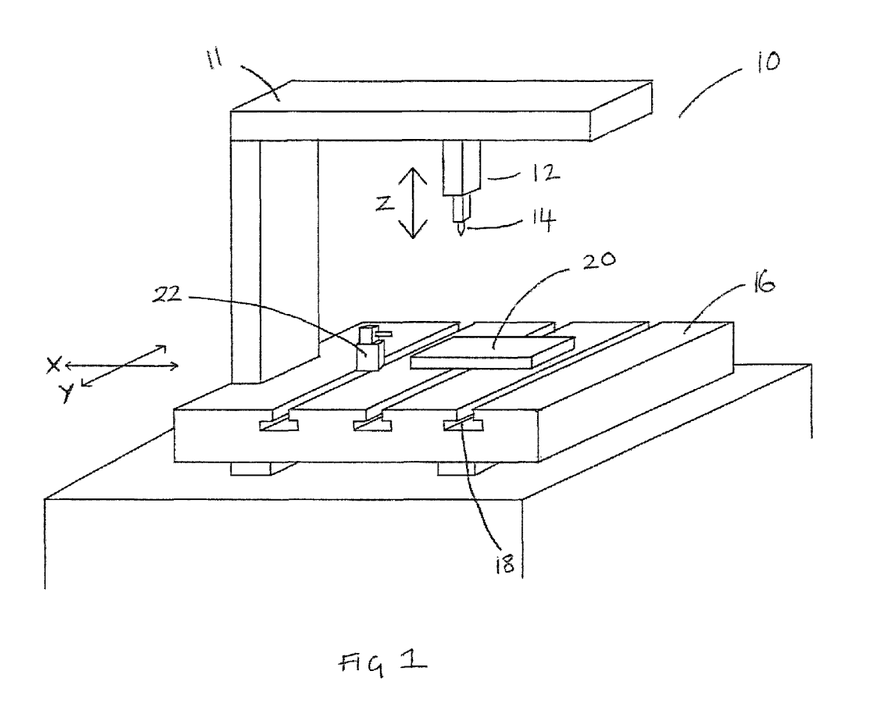
FIG. 1 shows a conventional machine tool having tee grooves in the machine tool bed.

Referring to FIG. 1, a conventional machine tool 10 comprises a bed 16 on which a workpiece 20 and any machine tool accessories, such as a tool setter 22, may be mounted. Tee grooves 18 formed in the machine tool bed 16 are spaced apart across the width of the bed 16 and run along its length from one end to the other. The machine tool 10 also comprises a frame 11 which supports a spindle 12 into which a tool 14 can be mounted.

The spindle 12 and machine tool bed 16 are moveable relative to one another in three orthogonal directions X, Y, Z within a working volume of the machine. In this instance the spindle 12 and tool 14 may move in the Z direction, while the table can move in the X and Y directions. Such movement is effected by X, Y, and Z drives controlled by a computer, interface or machine controller. Metrological scale reading apparatus is provided on each of the X, Y and Z axes in order to measure the relative movement of the spindle 12 in each direction; the spindle 12 and bed 16 can therefore be moved accurately relative to one another in order to machine a workpiece. In an alternative machine tool the spindle 12 may be moveable in X, Y and Z, the bed 16 remaining stationary. Any combination resulting in three degrees of freedom in movement of the tool 14 relative to the workpiece 20 is possible.

A machine tool can be used both to machine and to measure workpieces. The tool 14 shown in FIG. 1, used to machine a workpiece, can be replaced by a measurement probe which can be used to measure the workpiece. Although machine tools are described above, the apparatus can be used on other types of coordinate positioning apparatus such as coordinate measuring machines. In some types of coordinate positioning apparatus the tool approaches the workpiece from the side; in this case the workpiece supporting surface may be the bed of the apparatus, as shown in FIG. 1, or a surface perpendicular to bed of the apparatus (which in fact moves with the bed and could be considered an extension of the bed).

Figure 2:
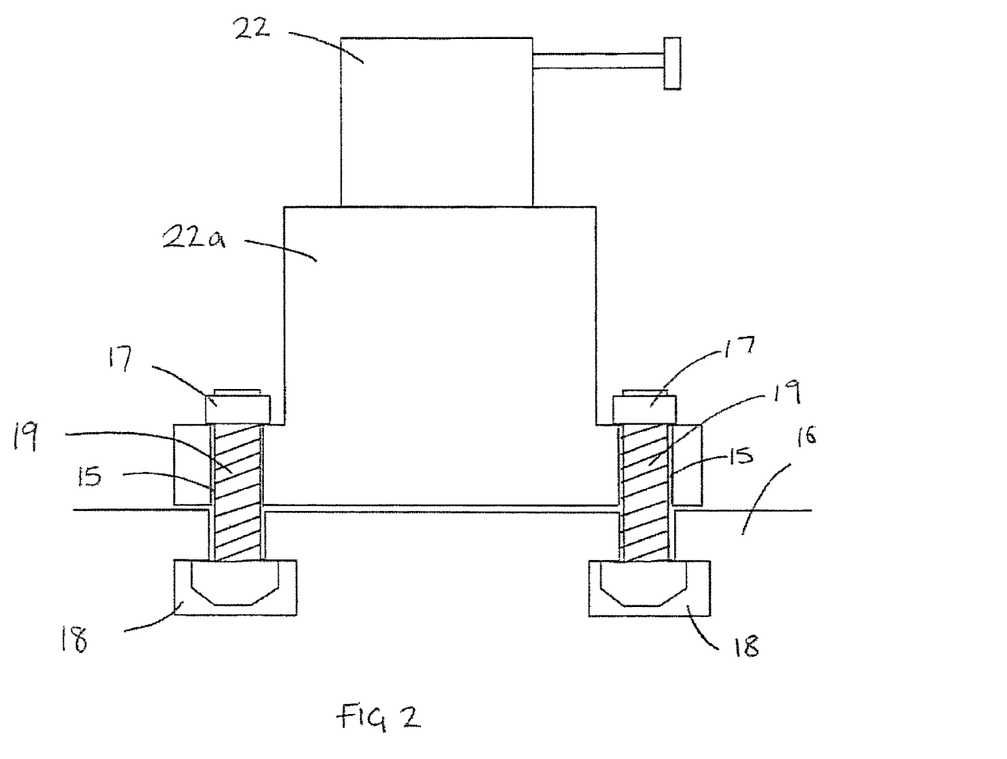
FIG. 2 shows a cross-section through a known apparatus for securing a machine tool accessory to the bed of a machine tool via a tee slot in the machine bed.

FIG. 2 shows a cross-section through a known apparatus for securing a tool setter 22 to the bed 16 of a machine tool via a tee slot 18 formed in the bed 16. The apparatus comprises a mount 22a attached to the tool setter 22, two tee bolts 19 and two nuts 17.

The tee bolts 19 may be positioned inside a tee slot 18, by sliding them into the slot via one of the open ends. The tee bolts 19 are loose in the tee slot 18 and can be slid along the tee slot 18 to the desired position of the tool setter 22. The tee bolts 19, which protrude from the surface of the machine tool bed 16, are each passed through a hole 15 in the mount 22a; a nut 17 is then tightened onto the end of each tee bolt 19 to secure the tool setter to the machine tool bed. The mount 22a may have a number of holes 15 through it, each secured to the machine bed 16 using a tee bolt 19 in a tee groove 18 and a nut 17.

When the nut is tightened onto the bolt, the bolt grips the underside of the machine tool bed in the tee slot, holding the tool setter 22 tight against the machine tool bed, in a fixed position. Once fixed to the machine tool bed 16 the position of the tool-setter is often calibrated before any tool-setting activities are carried out.

In order to remove the tool accessory 22 the nuts 17 must be loosened and the mount 22a lifted off the bolts 19. Once the nuts 17 are released the fixed position of the bolts 19 relative to the machine tool bed 16 is lost and the bolts 19 sit loosely within the tee slot 18 again. When the user wishes to reaffix the tool setter 22 to the machine bed 16, the bolts 19 must be repositioned and the nuts 17 reattached to the bolts 19. When replacing the tool setter 22 it is unlikely that the user could accurately reposition the bolts 19, and therefore the tool setter 22, in its previous position. As a consequence of this the position of the tool setter may have to be calibrated each time it is removed and replaced; thus increasing the overall time taken perform a tool setting operation.

In order to ensure that the tool setter 22 is securely fitted to the machine tool bed 16 tools are required, this requires the relevant tools to be available; fixing the nuts and bolts in position using tools can be time consuming. Additionally, when the tee bolt is not in use it can protrude above machine tool bed and thus can obstruct movement of, for example, the workpiece. In order to remove the tee bolt from the tee slot it must be slid all the way to the end of the slot; however, in some circumstances this is not possible due to objects, such as the workpiece, blocking its path.

Figure 3:
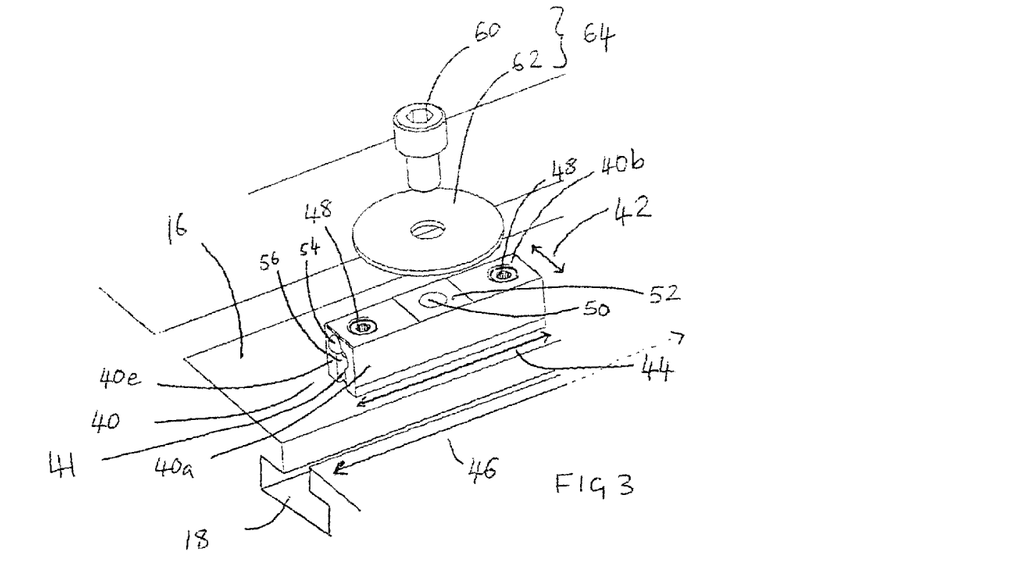
FIG. 3 shows an isometric view from a first side of an insert according to the present invention.

FIG. 3 shows an isometric view from a first side of an insert 40 according to the present invention, along with a machine tool bed 16 having a tee slot 18, and setting apparatus 64 for setting the position of the insert 40 within the tee slot 18. The setting apparatus 64 comprises a bolt 60 and a setting disc 62.

The insert 40 is substantially cuboid shaped; the insert 40 has three larger faces 40*a*, 40*b* (40*c* not shown) extending along the length 44 of the insert, and two smaller faces 40*e* (40*f* not shown) forming the end faces of the insert. The insert has a hollow inside, what would be the fourth large face of the cuboid being open. Slots 41 are provided through the end faces of the insert; in combination with the fourth face of the insert being open said slots 41 allow the width of the insert to expand when under force to fix the insert 40 within a slot by friction.

The width 42 of the insert is sized to fit within a tee slot 18 of a machine tool bed 16. When the insert 40 is positioned within the tee slot 18 the length 44 of the insert 40 extends along the length 46 of the tee slot 18; two opposing larger faces, the side faces 40*a* (40*c* not shown), of the insert 40 lie substantially parallel to the side walls of the tee slot 18. The third larger face 40*b* lies exposed to the working volume of the machine tool by the opening of the tee slot, and the open face lies concealed within the tee slot. Where possible the faces of the insert 40 are substantially flat so as to hinder any swarf present in the machine tool environment from getting trapped in or around the insert. When the insert is in placed within the slot, but the mount is not engaged with it, the insert may be covered by an insert cover to prevent swarf and coolant for example from entering the engaging means and other recessed areas of the insert.

The insert 40 has two tapered screws 48, the screw heads accessible from the exposed face 40*b* of the insert 40. The same face 40*b* has a central portion 52 into which a threaded bore 50 passes for receiving the bolt 60 of the setting apparatus 64. On each end face 40*e* (40*f* not shown) of the insert 40 a recess 56 and a protruding ball 54 are provided for receiving a mount on a machine tool accessory.

Figure 4:
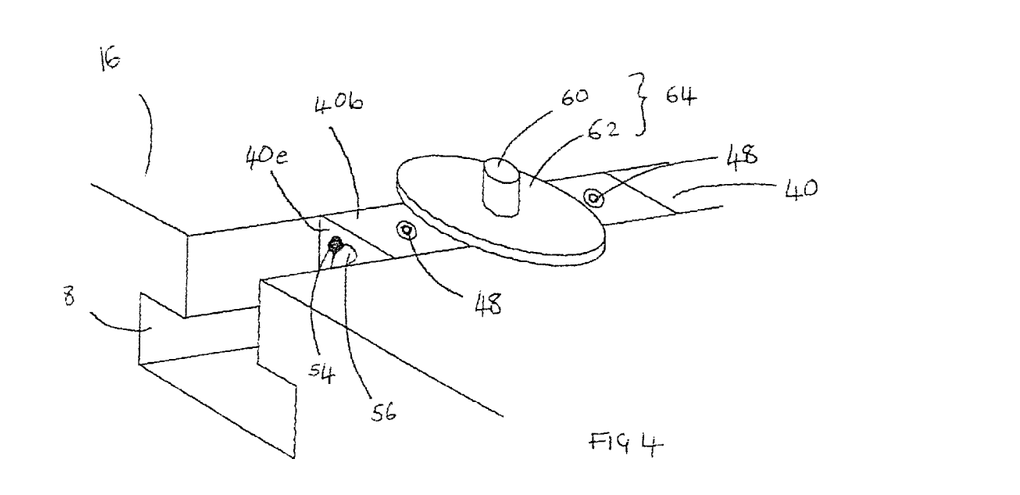
FIG. 4 shows an insert according to the present invention being positioned within a tee-slot of a machine tool bed.

FIG. 4 shows an insert according to the present invention being positioned within a tee-slot of a machine tool bed. In order to position the insert 40 within the tee slot 18 the bolt 60 is passed though a setting disc 62 and screwed into the threaded bore 50 in the insert 40. The insert 40 is then lowered into the tee slot 18 until the setting disc 62 lies flat against the machine tool bed 16. In this position the exposed face 40*b* of the insert thus lies substantially flush with the machine tool bed 16. The setting disc 62 is sized such that when it is secured to the insert 40 by the bolt 60 it does not prevent access to the heads of the screws 48. When the insert 40 is in position within the tee slot 18 the tapered screws 48 are tightened, thus increasing the width of the insert, until the insert 40 is fixed within the tee slot. The bolt 60 and setting disc 62 may then be removed from the insert 40 such that the insert 40 may receive a mount on a machine tool accessory.

In an alternative embodiment the exposed face 40*b* of the insert 40 may have a raised central portion 52 such that when setting the position of the insert 40 in the slot, as described above, the central portion 52 lies substantially flush with the machine tool bed 16 and the remainder of the exposed face 40*b* of the insert 40 lies substantially sub-flush with the machine tool bed 16.

The fact that the exposed face 40*b* of the insert 40 lies flush or sub-flush with the bed of the machine tool prevents rocking of the machine tool accessory when the accessory's mount is engaged with the insert in the tee slot. If the machine tool accessory has a substantially flat base it can thus sit substantially flat on the machine tool bed and is consequently more stable. The insert lying flush or sub-flush with the machine tool bed also has the effect that it is not in the way or easily knocked out of position when not engaged with a machine tool accessory mount.

Figure 5A:
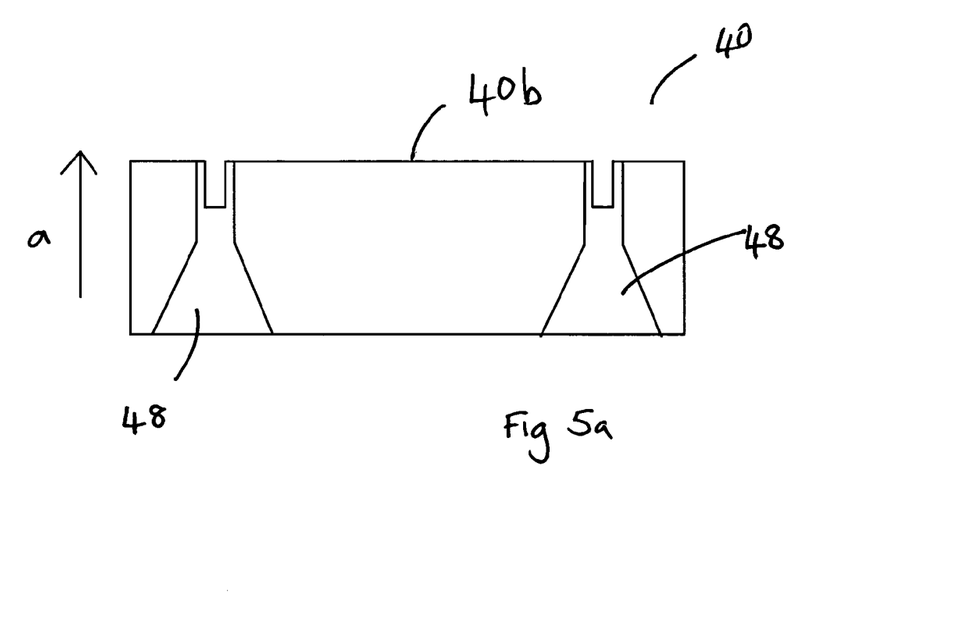
FIG. 5a shows a cross-section through a first insert according to the present invention.

FIG. 5*a* shows a cross-section along the length of an insert 40 according to the present invention, such that the tapered screws 48 for fixing the insert 40 within a tee slot can be seen. As the screws 48 are tightened the widest part of the screw moves towards the exposed face 40*b* of the insert, in the direction of the arrow a, forcing apart the opposing sides 40*a*.40*c* of the insert. The width 42 of the insert increases such that the two opposing side faces 40*a* (and 40*c* not shown) shown in FIG. 3, contact the side walls of the tee slot 18 and thus fix the insert 40 within the tee slot 18 by friction.

Figure 5B:
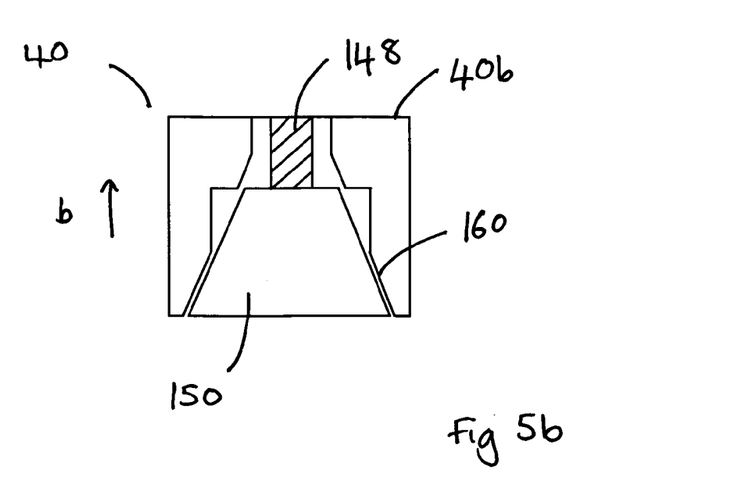
FIG. 5b shows a cross-section through a second insert according to the present invention.

FIG. 5*b* shows a cross-section through the width of a second embodiment of the insert 40, in this case the tapered screws are replaced by two standard screws 148 (only one shown) and a tapered wedge 150 which extends along the longitudinal length of the insert 40. As described with reference to FIG. 5*a* when the screws 148 are tightened the widest part of the wedge 150 moves towards the exposed face 40*b* of the insert, in the direction of the arrow b. The profile 160 of the hollow inside of the insert complements the shape of the tapered wedge such that as the wedge moves towards the exposed face of the insert 40*b* the opposing sides 40*a*.40*c* of the insert are forced apart. The width 42 of the insert increases such that the two opposing side faces 40*a* (and 40*c* not shown) shown in FIG. 3, contact the side walls of the tee slot 18 and thus fix the insert 40 within the tee slot 18 by friction. By using a wedge which extends along the longitudinal length of the insert the width expansion along the insert is more uniform that when using two tapered screws as shown in FIG. 5*a*.

Figure 5C:
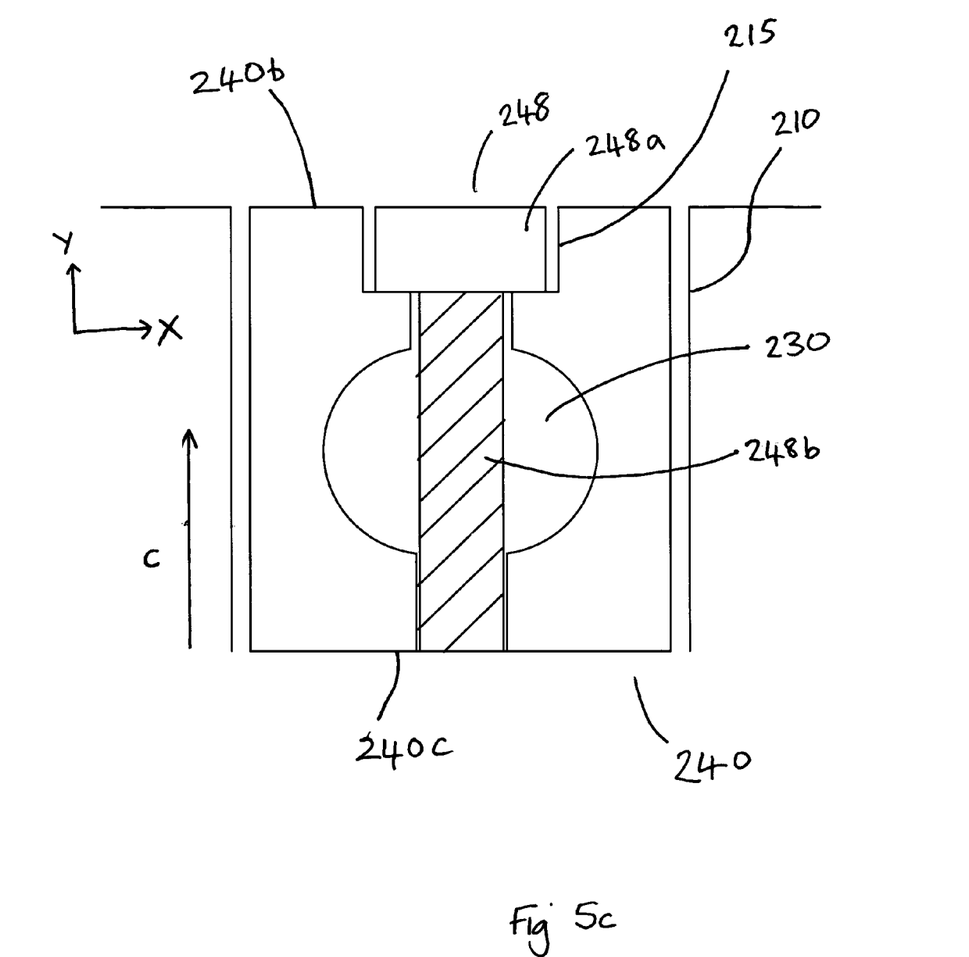
FIG. 5c shows a third insert according to the present invention.

FIG. 5*c* shows a cross-section through the width of a third insert 240. The insert 240 takes the form of an expandable tenon block. The insert 240 has a substantially rectangular external profile, such that it sits inside a T or U slot 210 of a machine tool bed, for example. The internal profile of the insert 240 is such that a hollow area 230 runs along the length of the insert 240, from end to end. Said hollow area 230 gives flexibility to the tenon block insert 240. The insert 240 comprises two counter bored holes 215 through it, from the exposed side 240*b* of the insert 240, passing through the hollow area 230, to a second side 240c of the insert 240. The counter bored holes 215 are each shaped to receive a screw 248.

Two standard screws 248 (only one shown), each comprising a screw head 248a and a threaded screw shaft 248b extending from the screw head 248a, enter the insert 40 on the first side of the insert 40. Clearance is provided between the screw 248 and the insert 240 at the end of the screw shaft 248b proximate the screw head 248a. At the distal end of the screw shaft 248b the second side 240c of the insert 240 is shaped and sized so as to engage the thread of the screw shaft 248b.

Tightening of the screw 248 causes the second side 240c of the insert 240 to be drawn along the screw shaft towards the exposed side 240b of the insert 240, in the direction of the arrow C. As the tenon block insert 240 is compressed in a first direction Y it expands in a second direction X. The second direction X is substantially orthogonal to the first direction Y. This expansion of the insert 240 fixes the insert 240 into a slot 210 of a machine too, for example, by friction. Advantageously the insert embodiment shown in FIG. 5c has only one piece, therefore it can be cheaper and easier to manufacture than other inserts. The embodiment of FIG. 5c could alternatively use only one screw, or more than two screws, for example.

Figure 6:
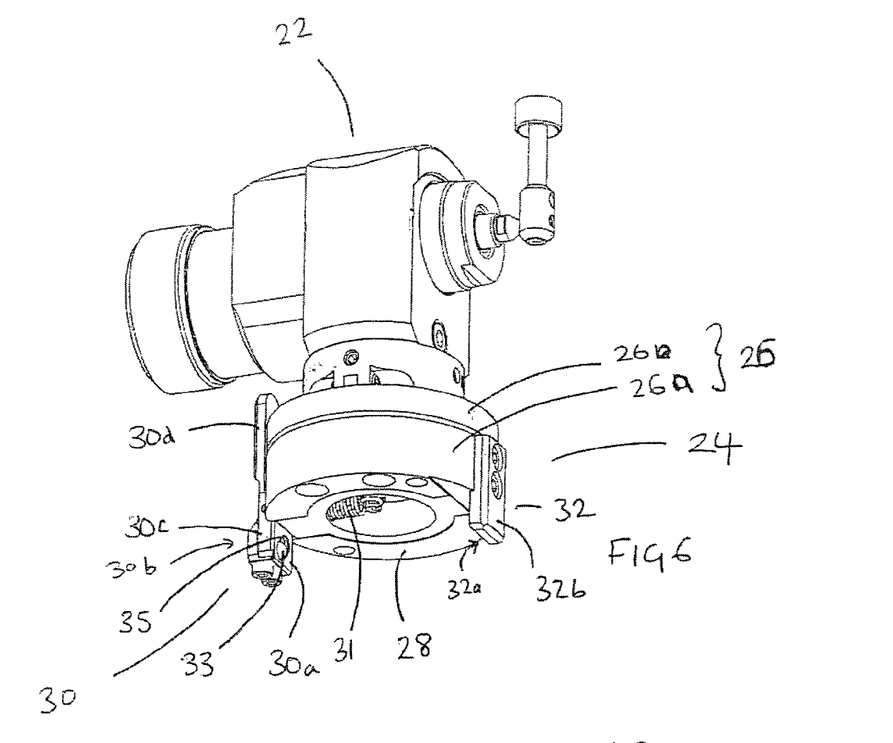
FIG. 6 shows an isometric view of a tool setter attached to a mount according to the present invention.

FIG. 6 shows an isometric view of a tool setter 22 attached to a mount 24 according to the present invention. The tool setter 22, in this case, is a contact tool setter 22. The mount 24 comprises a mount base 26; the mount base 26 having two parts 26a,26b. A first part 26a of the mount base comprises a base surface 28, which in use rests on the bed of the machine tool, a fixed protruding member 32, fixed relative to the first part 26a of the mount base, and a moveable protruding member 30, moveable relative to the first part 26a of the mount base. It will be apparent to the skilled person that alternatively both of the protruding members 30,32 could be moveable. In one embodiment the base surface 28 of the mount comprises three balls protruding from its surface which in use rest on the bed of the machine, this can help to make the mount more stable on the machine bed by providing only three points of contact.

The moveable protruding member 30 is biased by a spring 31 into a biased position; in use said biased position enables the mount to engage an insert according to the present invention. The moveable protruding member 30 is moveable against the biasing force of the spring 31 by a handle 30d, this movement results in an increase in the distance between the fixed 32 and moveable 30 protruding members such that in use the protruding members are able to pass easily over the edges of the insert. In this case the handle 30d is formed as part of the moveable protruding member 30. The moveable protruding member 30 is attached to the first part 26a of the base by a leaf spring 30c. The leaf spring 30c is arranged such that it eliminates any relative movement between the moveable protruding member and the base, other than a rocking movement against the bias and under the force of the bias. This ensures that the position of the moveable protruding member is repeatable when in its biased position.

The fixed protruding member 32 and moveable protruding member 30 (in its biased position) protrude from the first part 26a of the mount base 26, extending away from the tool setter 22 substantially perpendicular to the base surface 28. The fixed 32 and moveable 30 protruding members are arranged such that when the surface 28 of the first part 26a of the mount base is placed on the bed of the machine tool, over a tee slot, the protruding members extend into the tee slot. The width of the protruding members is slightly smaller that the width of the tee slot to allow some clearance when the protruding members are positioned around the insert within the tee slot.

The second part 26b of the mount base comprises attachment means (not shown) for attaching the mount 24 to the tool setter 22. The first 26a and second 26b parts of the mount are relatively moveable such that the relative tilt angle between the tool setter 22 and the surface 28 of the first part of the mount base can be adjusted as desired. This is achieved by spacing apart the first 26a and second 26b parts of the mount with a washer at one side of the mount, screws holding the two parts of the mount together can then be adjusted at the opposite side of the mount to alter the tilt angle between the two mount parts.

The fixed 32 and moveable 30 protruding members each have an inner surface 30a,32a, said inner surfaces facing towards one another. The inner surfaces 30a,32a are each provided with a ball 33 for engaging with the receiving means on the insert; approximately half of the ball 33 protrudes from the inner surface of the protruding members. The balls 33 are positioned on the inner faces 30a,32a of the protruding members such that when the protruding members engage the insert each ball 33 contacts a receiving means on the insert.

Where the insert has receiving means comprising a ball and a recess as in FIG. 5a, a recess 35 is provided on the protruding members directly adjacent each ball 33 for receiving the ball on the end face of the insert. The recess 35 is arranged such that it does not contact the ball on the insert but simply accommodates it.

Figure 7:
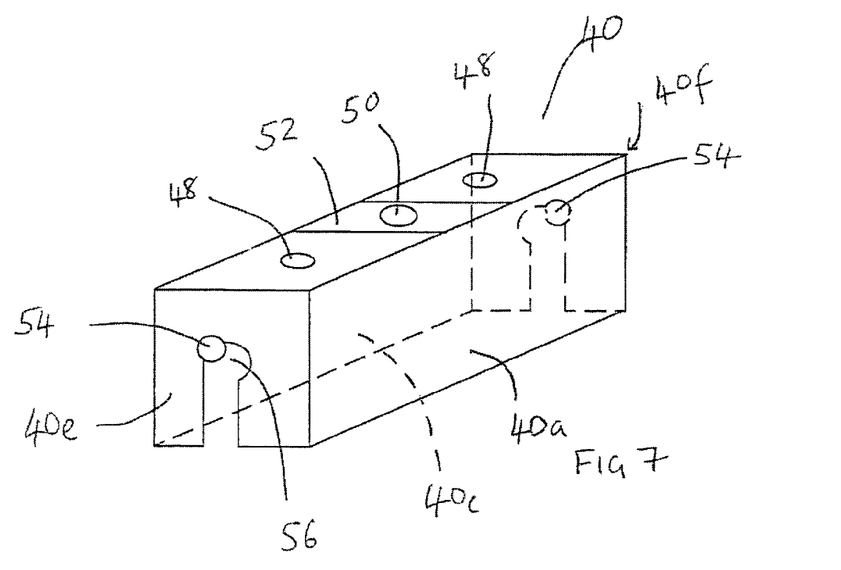
FIG. 7 shows a hidden detail isometric view of the insert shown in FIG. 3.

FIG. 7 shows a hidden detail isometric view of the insert shown in FIG. 3, such that both end faces 40e,40f of the insert 40 can be seen. As described previously a recess 56e,56f and a protruding ball 54e,54f are provided on each end face 40e,40f, together forming a receiving means for receiving a mount on a machine tool accessory. Approximately half of the ball 54 protrudes from the surface of the end face 40e,f. The recesses 56e,f are provided directly adjacent and to one side of the balls 54e,f. As can be seen in FIG. 7 the recess 56e on one end face 40e of the insert is offset to one side of the face, towards side face 40a, and on the other end face 40f the recess 56f is offset towards the other side face 40c.

The balls on the protruding members, as described with reference to FIG. 6 above, are positioned so as to contact the ball on the end face of the insert in such a way that they lie within the recess but do not contact it. When a ball on the protruding member contacts a ball on the receiving member of the insert the ball on the protruding member slides relative to the ball on the insert until it is offset from the ball on the insert at an angle of 45 degrees in X, Y, and Z. At this point the edge of the protruding member is brought into contact with a wall of the slot and further movement of the ball is prevented. A contact angle between the balls of 45 degrees in all axes gives nominally equal clamping forces in X, Y, and Z.

Figure 8A:
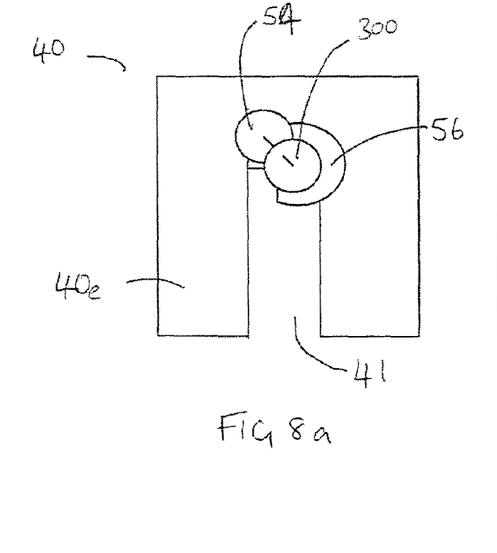
FIG. 8a shows a ball on one of the protruding members engaging with receiving means on one end of an insert 40 as shown in FIG. 7.

FIG. 8a shows a ball 300 on one of the protruding members engaging with receiving means, comprising a ball 54 and a recess 56, on one end of an insert 40 as shown in FIG. 7. The ball 300 on the protruding member contacts the ball 54 on the insert at one point only, the ball 300 on the protruding member does not contact the recess 56, the recess is simply provided as clearance for the ball 300 on the protruding member. If the recess were not present the ball would contact the end face of the insert and thus would not be correctly located. A second point of contact is provided at each end of the insert by the protruding member contacting the side wall of the slot in which the insert is fixed, this fixes the position of the balls relative to one another as described with reference to FIG. 7.

Figure 8B:
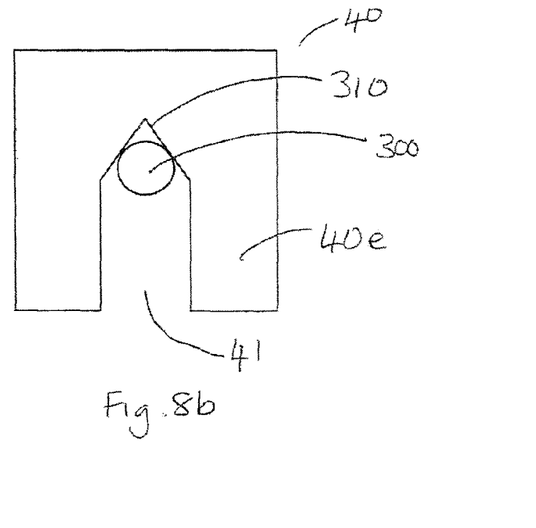
FIG. 8b shows receiving means in an alternative embodiment of the insert.

FIG. 8b shows an alternative embodiment of the insert wherein the receiving means at each end of the insert, for receiving the engaging means on the protruding members of the mount, comprises an upside-down V-shaped recess 310. The engaging means on the protruding member is a ball 300. The V-shaped recess 310 is provided centrally on the face of the insert, and the ball 300 on the protruding member is positioned so as to line up with the recess 310 when the protruding member engages the insert.

The upside-down V-shaped recess 310 at each end of the insert provides two points of contact for contacting a ball 300 on one of the protruding members on the mount; this results in four points of contact in total and thus constrains four degrees of freedom of the mount with respect to the insert.

In the embodiments shown in FIGS. 8a and 8b a fifth degree of freedom is restricted by the bias of the one moveable protruding member, and a sixth degree of freedom is constrained by the base surface of the mount of the tool setter lying substantially flat against the bed of the machine tool. In this case six degrees of freedom are constrained and the mount is kinematically located on the insert.

Figure 9:
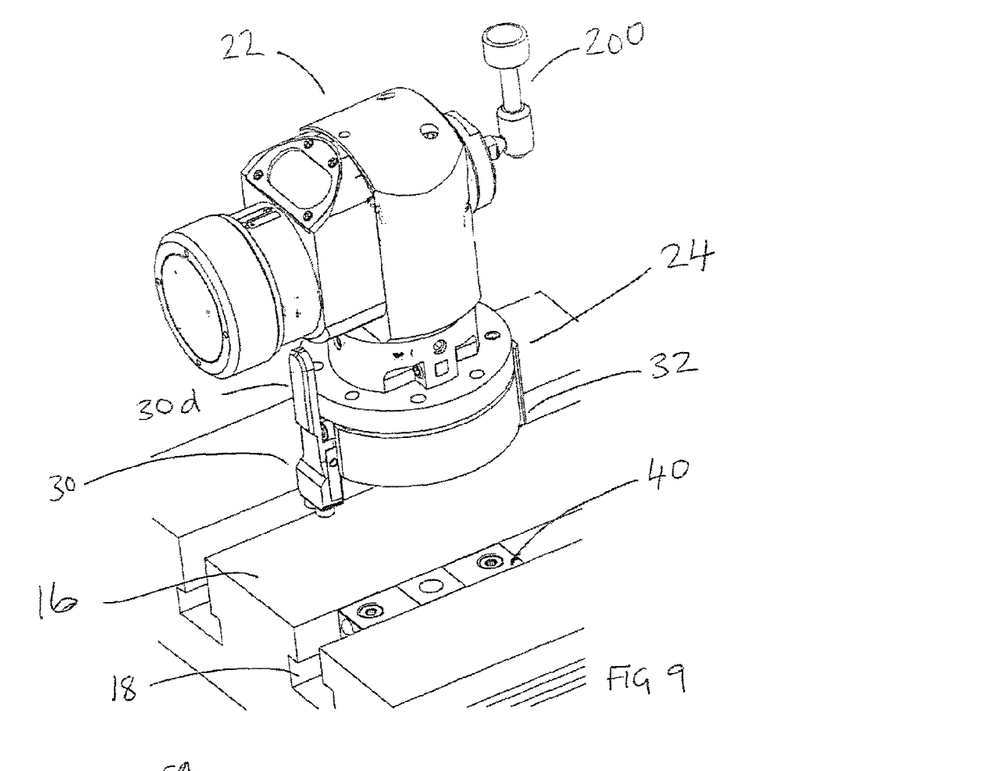
FIG. 9 shows an insert according to the present invention within a tee slot of a machine tool bed and a tool setter attached to a mount according to the present invention.

FIG. 9 shows an insert 40 according to the present invention within a tee slot 18 of a machine tool bed 16, and a tool setter 22 attached to a mount 24 according to the present invention. In order to hold the tool setter on the bed of the machine tool the tool setter mount 24 is engaged into the receiving means on the insert 40 fixed within a tee slot 18 in the machine tool bed 16. The handle 30d of the moveable protruding member 30 is moved against the bias of the spring 31 (shown in FIG. 6) in order to move the moveable protruding member 30 away from the fixed protruding member 32. The tool setter 22 and mount 24 are moved towards the machine tool bed 16, and the protruding members are passed into the tee slot 18 around the edges of the insert 40. The handle 30d of the moveable protruding member 30 is then released such that the ball on each of the fixed 32 and moveable 30 protruding members contacts the ball on each end face of the insert. The mount is easily clipped on to the insert, securing the tool setter to the bed of the machine tool. The reverse method is carried in order to remove the tool setter and mount from the insert.

It will be appreciated that the kinematic location of the mount on the insert ensures that after it has been removed, it can be clipped back on the insert in a repeatable position. Other, non-kinematic repeatable locations can be used instead.

At each end of the insert the ball on the protruding member lies within (but not contacting) the recess on the end face of the insert, and the ball on the end face of the insert lies within (but not contacting) the recess on the protruding member. The balls are positioned such that on contact the ball on the protruding member is forced towards one side of the insert, thus forcing the protruding member against one side wall of the slot in which the insert is fixed. The two protruding members are pushed in opposite directions such that the protruding members contact opposite side walls of the slot. In effect the mount is skewed relative to the insert within the slot. This holds the mount more securely in place by providing a further two points of contact and eliminating any side to side rattle of the mount.

In FIG. 9 the tool setting probe stylus 200 extends from the tool setter 22 in the direction of the length of the tee slot. For the embodiments of the receiving means on the insert described with reference to FIGS. 7, 8a and 8b the mount may be attached to the insert fixed within the tee slot such that the tool setting stylus extends in either direction along the length of the tee slot. The position of the tool setting probe stylus can therefore easily and quickly be turned through 180 degrees.

If desired, the mount can be removed from the toolsetter and its relative orientation adjusted by, for example, 90 degrees such that the tool setting probe extends perpendicular to the tee slot. The relative orientation of the tool setter and the mount can be adjusted such that the tool setting probe extends at discrete angles relative to length of the tee slot.

Figure 10:
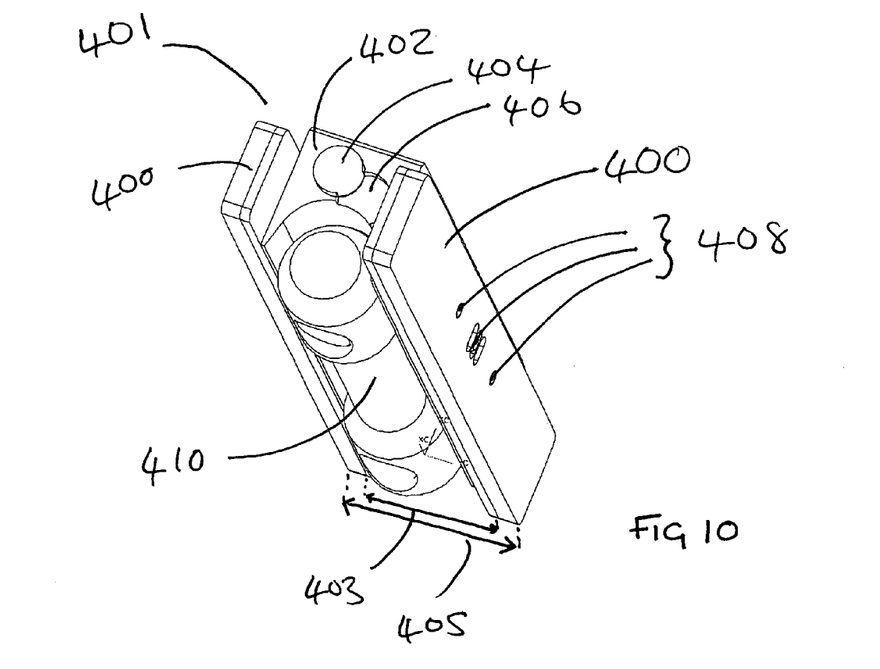
FIG. 10 shows an insert comprising shims on either side of the insert, thus increasing the width of the insert.

FIG. 10 shows an insert 401 comprising shims 400 on either side of the main insert body. The width of the insert 401 is thus increased from the width of the main insert body 403 to the width of the insert comprising shims 405. The shims 400 are attached to the main body 402 of the insert 401 by spring pins 408. The shims 400 are of equal width such that the width of the insert is increased equally on both sides. A variety of widths of shims 400 may be provided such that the width of the insert 401 can be tailored to the size of slot within which the user wishes to fix it.

The ball 404 and recess 406 on the end face of the insert, as described hereinbefore serve to locate a mount according to the present invention accurately with respect to the insert 401. The shims 400 are longer than the length of the main insert body 402 such that when the mount is located on the insert the two protruding members are forced in opposite directions such that the protruding members contact opposite shims 400. If the shims 400 were not longer that the main insert body 402 the protruding members of the mount for use with the main insert body alone would not be correctly sized to contact the sides of the slot. In this case the extra two degrees of freedom which are removed by contact with the side walls of the slot would be lost and the mount may not be kinematically mounted on the insert; additionally, the mount may rattle from side to side with respect to the insert.

As described with reference to FIG. 9, the mount may be mounted to the insert fixed within the slot such that the tool setting stylus extends in either direction along the length of the slot. The position of the tool setting probe stylus can therefore easily and quickly be turned through 180 degrees. Where the shims 400 are equal width the position of the tool setter will be accurately known in both of the two orientations.

Figure 11:
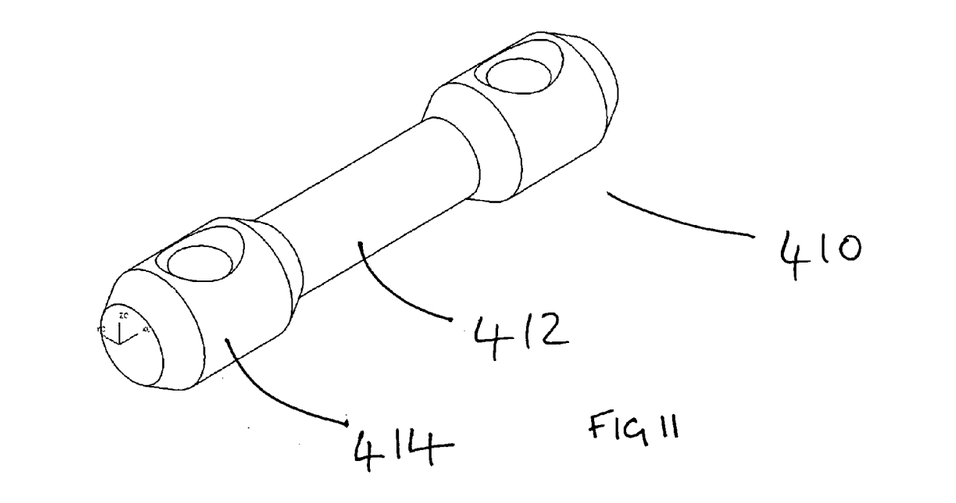
FIG. 11 shows a dog-bone cylindrical rod which can be used as an alternative to a tapered wedge to increase the width of the insert and thus hold the insert in a slot by friction.

FIG. 11 shows a dog-bone cylindrical rod 410 which can be used as an alternative to a tapered wedge to increase the width of the insert and thus hold the insert in a slot by friction. The rod 410 has larger diameter cylindrical portions 414 at either end and a reduced diameter portion 412 between the larger diameter portions 414. This shape is used as it is easier to machine than a cylinder of equal diameter along its length. Where, for example, a dog-bone shaped cylindrical rod is used, spring pins may be used to fix a shim to the insert. This is because where such shapes of rod are used there is empty space within the body of insert into which the spring pins can protrude.

Figure 12:
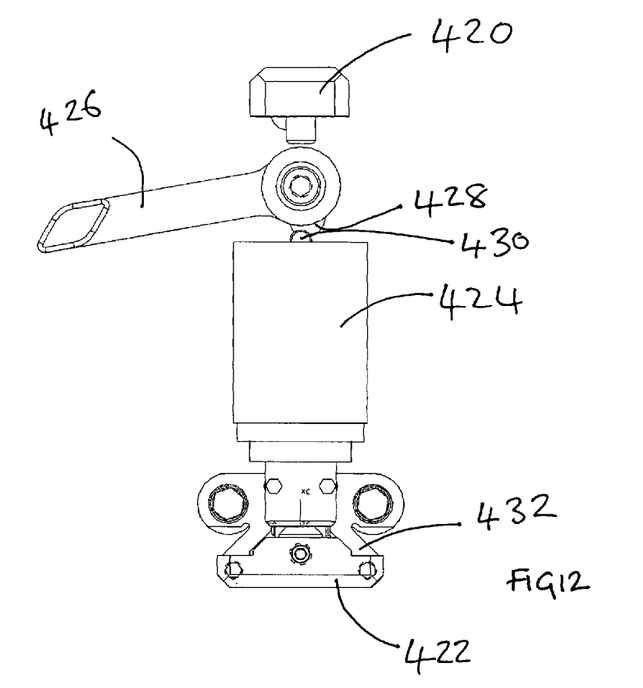
FIG. 12 shows a simplified plan view of the inside of a mount according to the present invention.
Figure 13:
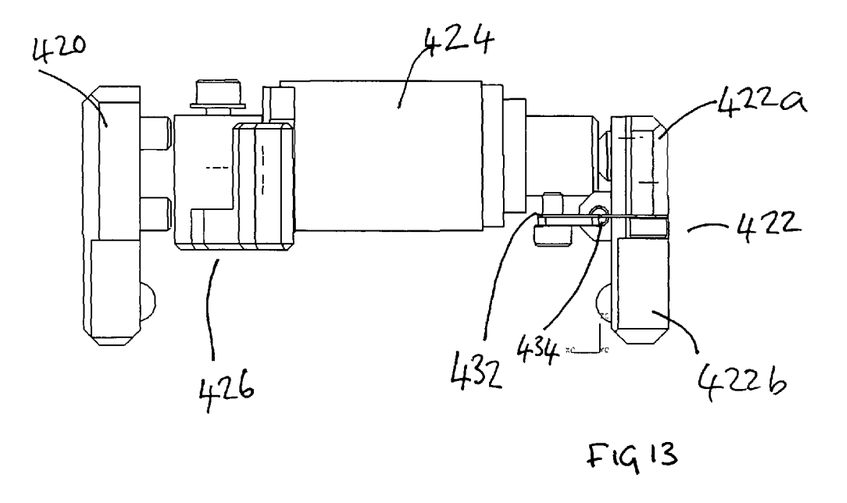
FIG. 13 shows a simplified side view of the protruding members and inside workings of the mount shown in FIG. 12.

FIG. 12 shows a simplified plan view of the inside of a mount according to the present invention and FIG. 13 shows a simplified side view of the protruding members and inside workings of the mount shown in FIG. 12. Instead of the moveable protruding member of the mount being biased into position by a spring inside the body of the mount (31 as shown in FIG. 6) the moveable protruding member 422 is biased into position by a leaf spring 432 which lies perpendicular to and passes through the moveable protruding member 422. The moveable protruding member 422 pivots about a pivot 434 relative to the mount body. The leaf spring 432 provides a force which allows the moveable protruding member to move such that the mount can be clipped over an insert and such that the mount is then held loosely in position on the insert. Once in place on the insert the mount may be firmly attached to the insert by actuating a lever 426. Actuating the lever 426 pushes a ball 428 (partly recessed within the lever body itself) against a roller 430 which in turn compresses a spring 424. The spring forces a first end 422a of the moveable protruding member 422 away from the mount body, forcing the moveable protruding member to pivot about the pivot point 434 and thus forcing a second end 422b of the moveable protruding member further towards the insert. The mount is then held securely onto the insert and is accurately positioned relative to the machine bed. In order to remove the mount from the insert the lever 426 is moved back into a release position and the compression on the spring 424 is decreased. The lever 426 is able to provide a substantially repeatable force for holding the mount fixed relative to the insert, thus the position of the mount with respect to the insert is substantially repeatable.

The invention claimed is:

1. An apparatus for mounting a coordinate positioning apparatus accessory to a workpiece mounting surface of a coordinate positioning apparatus, the workpiece mounting surface having a slot formed therein, the apparatus comprising:
   an insert comprising means for fixing the insert within the slot; and
   a mount attachable to the coordinate positioning apparatus accessory, the mount comprising at least one protruding member for engaging the insert when contained within the slot, thereby fixing the mount to the workpiece mounting surface of a coordinate positioning apparatus, wherein
   the means for fixing the insert within the slot is configured to retain the insert fixed within the slot with the insert lying flush or sub-flush with the workpiece mounting surface, when the mount is detached from the insert.

2. The apparatus according to claim 1, wherein the coordinate positioning apparatus is a machine tool.

3. The apparatus according to claim 1, wherein the means for fixing the insert within the slot comprises an expandable member, such that the insert is held within the slot by friction.

4. The apparatus according to claim 1, wherein the means for fixing the insert within the slot comprises one or more screws.

5. The apparatus according to claim 1, wherein the means for fixing the insert within the slot comprises an adhesive.

6. The apparatus according to claim 1, wherein the means for fixing the insert within the slot comprise means for fixing the insert within a tee slot formed in the workpiece mounting surface.

7. The apparatus according to claim 1, wherein the means for fixing the insert within the slot comprises means for fixing the insert within a U-shaped slot formed in the workpiece mounting surface.

8. The apparatus according to claim 1, wherein the mount comprises a plurality of protruding members.

9. The apparatus according to claim 8, wherein the mount comprises two protruding members.

10. The apparatus according to claim 8, wherein at least one of the plurality of protruding members is moveable relative to the mount.

11. The apparatus according to claim 10, wherein the at least one protruding member moveable relative to the mount is a hand moveable member.

12. The apparatus according to claim 8, wherein at least one of the plurality of protruding members is fixed relative to the mount.

13. The apparatus according to claim 1, wherein the action of engaging the at least one protruding member of the mount with the insert urges the mount into contact with the workpiece mounting surface.

14. The apparatus according to claim 1, wherein the insert is a longitudinal insert having first and second ends.

15. The apparatus according to claim 14, wherein the insert comprises at least one receiving means for receiving the at least one protruding member of the mount.

16. The apparatus according to claim 15 wherein the insert comprises two receiving means, the first receiving means provided at the first end of the insert and the second receiving means provided at the second end of the insert.

17. The apparatus according to claim 15, wherein the at least one receiving means provides one point of contact.

18. The apparatus according to claim 15, wherein the at least one receiving means provides two points of contact.

19. The apparatus according to claim 1, wherein the action of engaging the at least one protruding member of the mount with the insert urges the at least one protruding member of the mount against at least one wall of the slot in which the insert is contained.

20. The apparatus according to claim 1 comprising a coordinate positioning apparatus accessory attached to the mount, wherein the coordinate positioning apparatus accessory comprises a tool-setter.

21. The apparatus according to claim 1 comprising a coordinate positioning apparatus accessory attached to the mount, wherein the coordinate positioning apparatus accessory comprises a measurement probe.

22. The apparatus according to claim 1, for mounting a coordinate positioning apparatus accessory to a workpiece mounting surface on a bed of a coordinate positioning apparatus.

23. The apparatus according to claim 1, for mounting a coordinate positioning apparatus accessory to a workpiece mounting surface on a pallet.

24. An insert comprising:
   means for fixing the insert within a slot in a workpiece mounting surface of a coordinate positioning apparatus; and
   means for engaging at least one protruding member of a mount, the protruding member being attachable to a coordinate positioning apparatus accessory when the insert is retained in the slot to thereby fix the mount to the insert, wherein
   the means for fixing the insert within the slot is configured to retain the insert fixed within the slot with the insert lying flush or sub-flush with the workpiece mounting surface when the mount is detached from the insert.

25. The insert according to claim 24, wherein the coordinate positioning apparatus is a machine tool.

26. The insert according to claim 24, wherein the means for fixing the insert within the slot in the workpiece mounting surface of a coordinate positioning apparatus comprises an expandable member, such that the insert is fixed within the slot by friction.

27. The insert according to claim 24, wherein the means for fixing the insert within the slot comprises screws.

28. The insert according to claim 24, wherein the means for fixing the insert within the slot comprises glue.

29. An apparatus for mounting a coordinate positioning apparatus accessory to a workpiece mounting surface of a coordinate positioning apparatus, the workpiece mounting surface having a slot formed therein, the apparatus comprising:
- an insert comprising a fixing device operable to retain the insert fixed within the slot; and
- a mount attachable to the coordinate positioning apparatus accessory, the mount comprising at least one protruding member for engaging the insert when contained within the slot, thereby fixing the mount to the workpiece mounting surface of a coordinate positioning apparatus, wherein
- the fixing device is configured to retain the insert fixed within the slot with the insert lying flush or sub-flush with the workpiece mounting surface when the mount is detached from the insert.

\* \* \* \* \*